United States Patent [19]

Blizard

[11] 4,415,998
[45] Nov. 15, 1983

[54] SEGMENTED ACOUSTIC TRANSMITTER FOR BROAD FREQUENCY INVESTIGATION OF A BOREHOLE

[75] Inventor: Robert B. Blizard, Littleton, Colo.

[73] Assignee: Schlumberger Technology Corp., New York, N.Y.

[21] Appl. No.: 131,241

[22] Filed: Mar. 17, 1980

[51] Int. Cl.³ .............................................. G01V 1/40
[52] U.S. Cl. ...................................... 367/25; 367/912; 310/334; 181/106
[58] Field of Search ................ 367/25, 912, 155, 162; 181/106; 73/641; 310/321, 322, 332, 334

[56] References Cited

U.S. PATENT DOCUMENTS

| | | | |
|---|---|---|---|
| 2,868,311 | 1/1959 | Tullos | 367/912 |
| 2,878,886 | 3/1959 | Overton | 367/912 |
| 2,894,597 | 7/1959 | Kean et al. | 367/25 |
| 3,111,595 | 11/1963 | Lenger | 367/162 |
| 3,136,381 | 6/1964 | Anderson | 367/25 |
| 3,180,626 | 4/1965 | Mettler | 310/322 |
| 3,292,018 | 12/1966 | Clynes | 310/334 |
| 3,496,533 | 2/1970 | Semmelink | 367/912 |
| 3,922,572 | 11/1975 | Cook et al. | 310/337 |
| 4,075,600 | 2/1978 | Sims et al. | 367/155 |
| 4,209,766 | 6/1980 | Teel | 367/155 |

Primary Examiner—Nelson Moskowitz
Attorney, Agent, or Firm—Kenneth Olsen; Steven L. Borst; Louis H. Reens

[57] ABSTRACT

A broad bandwidth segmented acoustic transmitter is described formed of a plurality of differently sized, closely spaced acoustically active and separately energizable segments. Each segment is operated at a separate resonance to provide, with the acoustic energy from the other segments, a broad frequency spectrum composite acoustic pulse. In one embodiment the segments are aligned along a common axis with their respective lengths, as measured along this axis, selected to provide an acoustic pulse with broad bandwidth. The segments are energized by a common pulse to provide an acoustic spectrum which improves the measurement of acoustic parameters such as the compressional and shear wave interval travel times.

7 Claims, 7 Drawing Figures

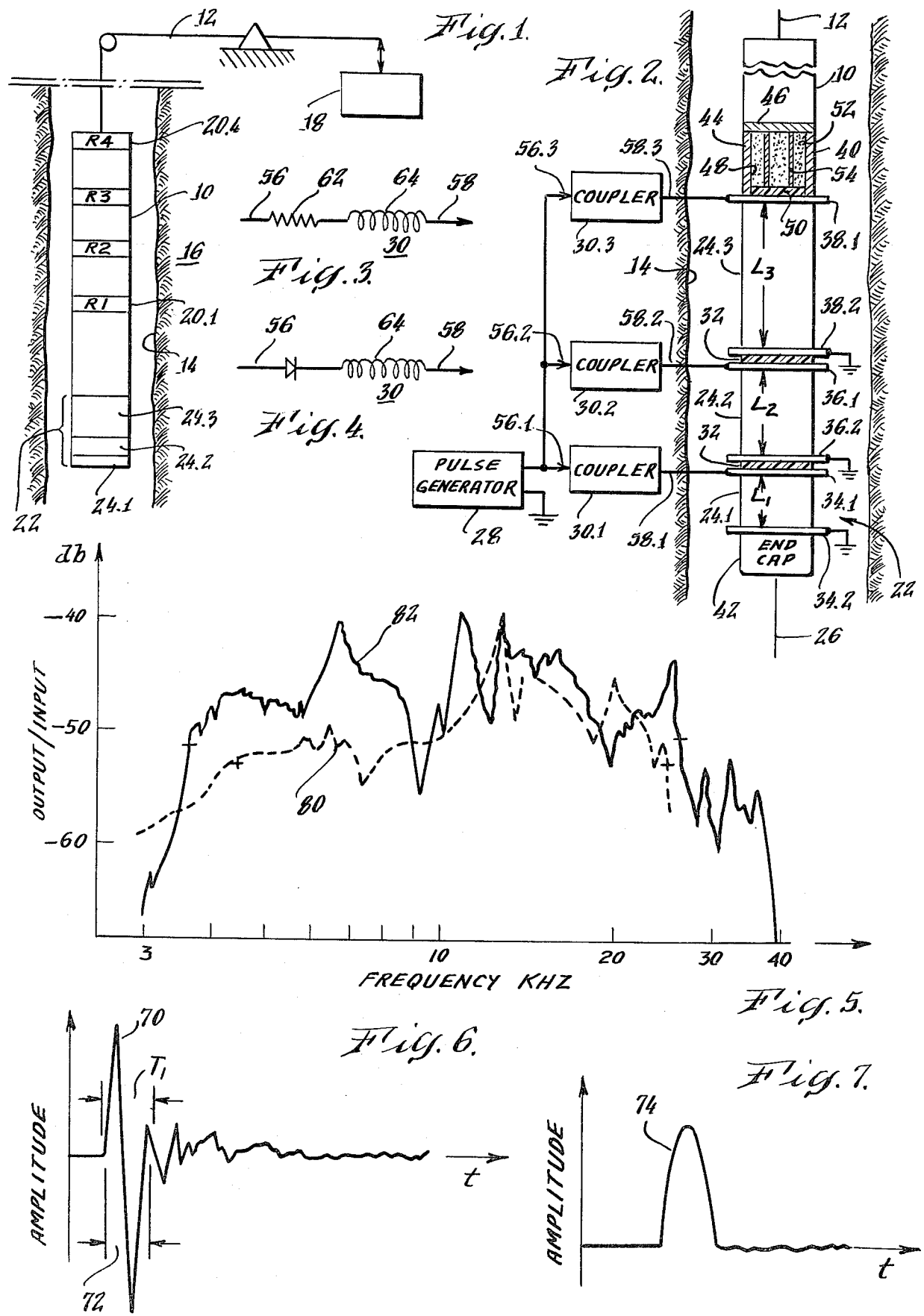

SEGMENTED ACOUSTIC TRANSMITTER FOR BROAD FREQUENCY INVESTIGATION OF A BOREHOLE

FIELD OF THE INVENTION

This invention relates to an apparatus for generating acoustic pulses for use in the acoustic investigation of an earth formation. More specifically this invention relates to an apparatus for producing an acoustic pulse having a broad frequency spectrum.

BACKGROUND OF THE INVENTION

Transducers for generating wide frequency band acoustic energy in a borehole environment can be particularly useful in the acoustic investigation of the surrounding earth formation. Various transducers have been proposed as in, for example, the U.S. Pat. No. 3,496,533 to Semmelink in which a plurality of transducers are shown vertically stacked to achieve a desired acoustic beam steering capability of a receiver. A broad bandwidth is achieved by operating the receivers well below their resonance.

A segmented acoustic transducer is described in the U.S. Pat. No. 3,177,382 to Green. In the U.S. Pat. No. 4,004,267 to Mayne a technique is described for exploring a subsurface formation with acoustic pulses which individually are of narrow bandwidth but are spaced in frequency over a desired frequency spectrum. The frequency spacing may be in a geometric progression or in an arithmetic progression.

It can be particularly desirable in certain acoustic investigations of an earth formation from a borehole with a multiple receiver tool to use an acoustic transmitter capable of generating an acoustic pulse of relatively broad bandwidth. For example, when multiple receiver waveforms are used in a multifold correlation technique such as described in the U.S. Pat. No. 4,131,875 to Ingram, a broad bandwidth acoustic signal source provides a more narrow peak in the correlation function with low amplitude side lobes. A broad bandwidth acoustic signal source thus improves the ability to resolve significant acoustic waves such as compressional, shear and casing waves.

SUMMARY OF THE INVENTION

With an acoustic source in accordance with the invention, a broad bandwidth acoustic pulse can be produced for investigation of an earth formation from a borehole. This is achieved by employing a segmented acoustic transmitter wherein the segments are aligned in proximity to each other in an array along a common axis so that their acoustically active surfaces radiate acoustic energy in a composite acoustic impulse in a generally common direction. The lengths of the respective acoustically active surfaces of the transmitter segments are selected in a predetermined manner so that the composite acoustic pulse has a desired frequency bandwidth.

As described herein for one form for a segmented acoustic transmitter in accordance with the invention, the lengths of the active acoustic surfaces, as measured along the common axis, are made whole multiples of the shortest active surface length employed. With such transducer structure, a broad frequency spectrum is obtained suitable for yielding sharp correlation peaks in a multiple receiver acoustic investigation tool.

It is, therefore, an object of the invention to provide a segmented acoustic transmitter capable of generating an acoustic pulse having a broad frequency bandwidth for use in an acoustic investigation of a borehole.

These and other advantages and objects of the invention can be understood from the following detailed description of an embodiment described herein in conjunction with the drawings.

BRIEF DESCRIPTION OF DRAWINGS

FIG. 1 is a schematic representation of an acoustic investigation tool employing a segmented acoustic transmitter in accordance with the invention;

FIG. 2 is an enlarged elevation view and partial schematic representation of a segmented acoustic transmitter in accordance with the invention;

FIG. 3 is a schematic representation of one specific coupling network used to energize the segmented acoustic transmitter in accordance with the invention;

FIG. 4 is a schematic representation of another coupling network;

FIG. 5 is an amplitude-frequency plot for a segmented acoustic transmitter in accordance with the invention;

FIG. 6 is a time-amplitude plot of a drive pulse applied to the segmented acoustic transmitter of FIG. 3; and FIG. 7 is a time-amplitude plot of a current pulse used in driving the segmented acoustic transmitter of FIG. 3.

DETAILED DESCRIPTION OF DRAWINGS

With reference to FIG. 1, an acoustic investigation tool 10 is shown suspended from a cable 12 in a borehole 14 penetrating an earth formation 16. The cable 12 is connected to a surface located control console 18 from where, as is well known in the art, appropriate tool controls and electrical power are provided and waveforms representative of detected acoustic waves are recorded.

Tool 10 is a multiple receiver type in which, for example, four sonic receivers 20 are used to detect acoustic waves generated in borehole 14 and earth formation 16 by a segmented acoustic transmitter 22. The receivers 20 generate waveforms representative of the acoustic waves after these have traveled through borehole 14 and formation 16. The processing of the receiver waveforms may involve multifold correlation techniques as described in the U.S. Pat. No. 4,131,875 to Ingram to measure formation parameters such as compressional and shear wave interval travel times.

It is particularly useful to investigate the earth formation 16 with acoustic energy of substantial amplitude and over a sufficiently broad frequency range. For this purpose acoustic transmitter 22 is formed of selectively sized acoustic energy radiating segments 24.1, 24.2 and 24.3. In the embodiment of FIGS. 1 and 2, segments 24 are formed of like diameter radially poled ceramic cylinders mounted along a common axis 26.

The radiating segments 24 are energized by a pulse generator 28 which provides the voltage and currents through predetermined coupling networks 30 to drive segments 24. The pulses from generator 28 may be initiated from a clock located in tool 10 or from the surface located control console 18 along an appropriate control line in cable 12.

Segments 24 are closely axially spaced to each other separated by thin annular insulator segments 32. Electrode pairs 34, 36, 38 are placed at axial ends of cylindrical segments 24.1, 24.2 and 24.3 respectively to energize them with electrical pulses applied through networks 30. An acoustic damper 40 is placed at the upper end of the axially longer segment 24.3 and an end cap 42 is located at the bottom end of axially shortest segment 24.1. Both damper 40 and end cap 42 absorb cavity resonances.

The damper 40 and end cap 42 are hollow cylindrical bodies such as may be made of steel cylinders 44 attached to brass end 46. The bore 48 of damper 40 is closed by an acoustically transparent window 50 which may be a material such as methacrylate so that bore 48 can be filled with an acoustic damping liquid such as a viscous oil 52. The bore 48 is provided with steel baffle plates 54 aligned parallel to the common axis 26 and attached to end 46.

Actuation of transmitter segments 24.1, 24.2 and 24.3 is done simultaneously with a pulse from network 28 and applied to inputs 56.1, 56.2 and 56.3 of coupling networks 30. Their outputs 58.1, 58.2 and 58.3 are connected to electrodes 34.1, 36.1 and 38.1 respectively. Electrodes 34.2, 36.2 and 38.2 are connected to a common ground return.

The transmitter segments 24 and the electrical drive signals are selected to operate the segments 24 at their respective resonances. The individual segment resonances are selected to provide an overall frequency bandwidth desired for the acoustic investigation.

The axial proximity of the separate segments 24 and their simultaneous energization causes the entire transmitter 22 to operate at low frequencies with an effective radiating length, as measured along axis 26, about equal to the sum of individual segment lengths $L_1$, $L_2$ and $L_3$. At higher frequencies the effective axial length decreases gradually, thus advantageously avoiding sharp directivity effects from a transmitter having the same length as the combined segments 24.1, 24.2 and 24.3.

For example, in the measurement of compressional and shear wave velocities through earth formation 16, an acoustic spectrum for the transmitter 22 from about four to about twenty-five kiloherz can be particularly useful. Such transmitter bandwidth may be achieved by employing axially closely spaced radiating segments 24.1, 24.2 and 24.3 having lengths related to each other in units of 1, 2 and 3 respectively and having individual electrical resonances (including reactive components of coupling networks 30) at about 15, 8 and 5 KHz.

Coupling networks 30 are selected to provide, in combination with the transmitter segments 24, appropriate resonances. Networks 30 thus may employ components such as shown in FIG. 3 including a resistor 62 in series with an inductance 64. In such case the resistances 62 in the coupling networks provide appropriate damping and may in each network 30 be of equal value. The inductances 64 are selected to provide desired resonances with the equivalent capacitances presented by the transducer segments 24.

Coupling networks 30 may take a form as shown in FIG. 4 with a diode 66 in series with inductance 64. The diodes 66 can improve the efficiency of networks 30 while providing the desired damping effect as resistors 62 in the network shown in FIG. 3.

Excitation of the transmitter segments 24 is controlled with pulses produced by generator 28 and which pulses may have a shape as shown for waveform 70 in FIG. 6.

The time interval 72 in FIG. 6 is 100 microseconds. The specific pulse shape is illustrative and may vary. However, in the selection of the pulse 70, its length, $T_1$, preferably should be about one and a half times the period of the hoop mode for the segments 24.3. The pulse length, $T_1$, for pulse 70 in FIG. 6 is about 106 microseconds. FIG. 7 illustrates the shape of a current pulse 74 delivered by pulse network 28 using a pulse such as 70.

FIG. 5 illustrates several frequency response curves 80, 82 for a segmented transmitter 22 in accordance with the invention. The curves 80, 82 represent the acoustic output, as measured by a sonic receiver relative to a predetermined input signal level. Curve 80 represents a frequency response for a segmented transmitter as shown in FIG. 2 using a coupling network as illustrated in FIG. 4. The curve 80 shows a ± 6db quarter power bandwidth from about 4.5 KHz to about 25 KHz.

Curve 82 represents a frequency response for a segmented acoustic transmitter 22 as shown in FIG. 2, but with axially open ends, thus without the use of damper 40 and end cap 42. Curve 82 shows a ± 6db bandwidth from about 3.7 KHz to about 26 KHz.

The lengths $L_1$, $L_2$ and $L_3$ of transmitter segments 24 as used in generating the frequency response curves 80, 82 were one, two and three inches.

With a segmented acoustic transmitter in accordance with the invention, a gradual fall-off of the amplitude of the electric drive to the lower frequency resonating segments such as 24.2 and 24.3 occurs. This can be attributed to the use of separate and differently sized inductances 64 in the respectively connected coupling networks 30.2 and 30.3 and advantageously prevents sharp directivities as would be encountered with a non-segmented transmitter as well as enables smoothing of the frequency response across the frequency spectrum of interest.

The coupling networks 30 introduce phase shifts between the voltages applied to transmitter segments 24.1, 24.2 and 24.3. The phase shifts tend to steer the composite acoustic beam towards the longer segment 24.3. The segments 24, are, therefore, preferably so placed that the longer segment is nearer the sonic receivers 20 used on tool 10.

Having thus explained a segmented acoustic transmitter in accordance with the invention, its advantages can be appreciated. A wide bandwidth acoustic source can be obtained with a substantial bandwidth. Variations from the described embodiment can be made without departing from the scope of the invention as set forth in the following claims. For example, the embodiment described herein employs three axially mounted acoustic transmitter segments. However, additional segments may be employed.

I claim:

1. A segmented acoustic transmitter for generating an acoustic pulse for use in an acoustic investigation of a borehole penetrating an earth formation with a multiple sonic receiver tool comprising a plurality of individually energizable cylindrical acoustic transmitter segments having active surfaces from which acoustic energy radiates, said acoustic transmitter segments being generally coaxially aligned along a common axis with their acoustically active surfaces radiating acoustic energy in a generally common direction, said acoustic transmitter segments being located axially in proximity to each other to enable generation of a composite acoustic impulse in said common direction when said acoustic transmitter segments are electrically energized, with said transmitter segment surfaces as measured along said common axis, being of successively different and larger lengths and with the respective lengths selected in accordance with a predetermined relationship with each other wherein the lengths of said segment surfaces are whole multiples of the shortest surface length employed for one of said acoustic transmitter segments and with said whole multiples being at least two and three to impart to said composite acoustic pulse with a desired frequency bandwidth, with the segment having the largest length being located nearest to sonic receivers on said tool;

means for driving said segments with a common electrical pulse, said driving means including:

a pulse generator, a plurality of differently sized inductances respectively in series between a segment and said pulse generator, the inductances being selected to operate said segments in respective resonances.

2. The segmented acoustic transmitter for generating a broad bandwidth acoustic pulse as set forth in claim 1 wherein said drive means further includes a plurality of rectifiers individually respectively interposed in series between the pulse generator and said inductances.

3. The segmented acoustic transmitter as set forth in claim 1 and further including an acoustic damper located adjacent the longest segment.

4. The segmented acoustic transmitter as set forth in claim 3 wherein said damper is formed of a hollow body and a plurality of plates mounted therein, said hollow of the damper being further provided with a viscous liquid to enhance damping of internal resonances of said segments.

5. The segmented acoustic transmitter as set forth in claim 4 wherein said plates are mounted generally parallel with said common axis.

6. The segmented acoustic transmitter as set forth in claim 5 wherein said transmitter segments are hollow and an acoustically transparent window is located between the hollow of the damper and said longest segment.

7. The segmented acoustic transmitter as set forth in claim 3 and further including an end cap located adjacent the segment having the shortest active surface.

* * * * *